May 1, 1951 S. R. R. KHARBANDA 2,550,821

COMBINED TELEVISION AND SOUND SYSTEM

Filed Jan. 17, 1944 2 Sheets-Sheet 1

Inventor
S.R.R. KHARBANDA
By [signature]
Attorneys

May 1, 1951 S. R. R. KHARBANDA 2,550,821

COMBINED TELEVISION AND SOUND SYSTEM

Filed Jan. 17, 1944 2 Sheets-Sheet 2

Inventor
S.R.R. KHARBANDA.
By
[signature]
Attorneys

Patented May 1, 1951 2,550,821

UNITED STATES PATENT OFFICE 2,550,821

COMBINED TELEVISION AND SOUND SYSTEM

Sant R. R. Kharbanda, Cambridge, England, assignor to Pye Limited, Cambridge, England, a British company Application January 17, 1944, Serial No. 518,591
In Great Britain January 7, 1943

Section 1, Public Law 690, August 8, 1946
Patent expires January 7, 1963

28 Claims. (Cl. 178—5.6)

The invention relates to a system in which speech or other modulation of suitable frequency band width may be transmitted by a carrier which is simultaneously modulated by vision and synchronising wave forms as is commonly employed in television systems.

According to the present invention, the sound intelligence is transmitted with the picture and the synchronising signals on a single carrier wave by transmitting the sounds in the form of a series of pulses which are modulated in width, phase or frequency but are of constant amplitude, the pulses being introduced into the waveform during the line blanking periods.

In order that the invention may be more clearly understood, reference will be made to the accompanying drawings, in which:

Fig. 1 indicates a typical television wave form of the positive modulation type.

Figure 1:
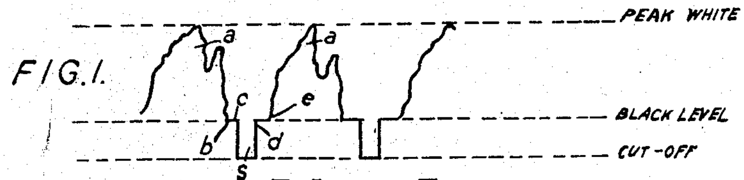
Fig. 1 shows a typical television wave form of the positive modulation type. *a* represents the picture intelligence. *b* indicates the start of the blanking signal, *c* the start of the normal synchronising pulses S, *d* the end of this pulse, and *e* the end of the blanking period.
Figure 2:
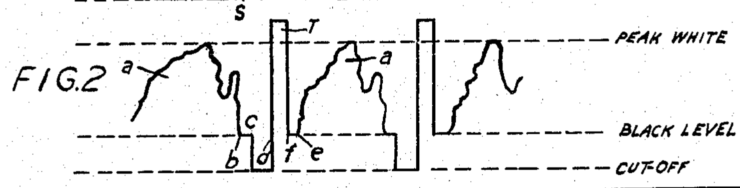
Fig. 2 shows one way of modifying the wave form of Fig. 1 for the purpose of carrying out this invention.

The invention consists in simultaneously transmitting sound intelligence over the same carrier wave by transmitting the sound in the form of a series of modulated pulses which are modulated in width, phase or frequency but are of constant amplitude and are introduced into the waveform during the line blanking periods when the picture intelligence is suppressed. One method of doing this is illustrated in Fig. 2 in which the sound pulse T is inserted in the form of a further pulse of opposite sign to that of the synchronising signal during the blanking period and immediately following the synchronising pulse S. The point *d* indicates the start and *f* the end of this sound pulse T. The pulse T extends into the "whiter-than-white" region and is of constant amplitude but is modulated in width in known manner in accordance with the sound to be transmitted, the pulse width being proportional to the depth of modulation and the rate of change of pulse width to the modulation frequency. In the receiver the sound modulated pulses are separated from the rest of the signal to operate the sound reproducing apparatus. The "whiter-than-white" pulse may also be peak rectified in the receiver and used for automatic gain control purposes. The repetition rate of the pulses must be greater than the highest sound frequency to be transmitted.

Figure 3:
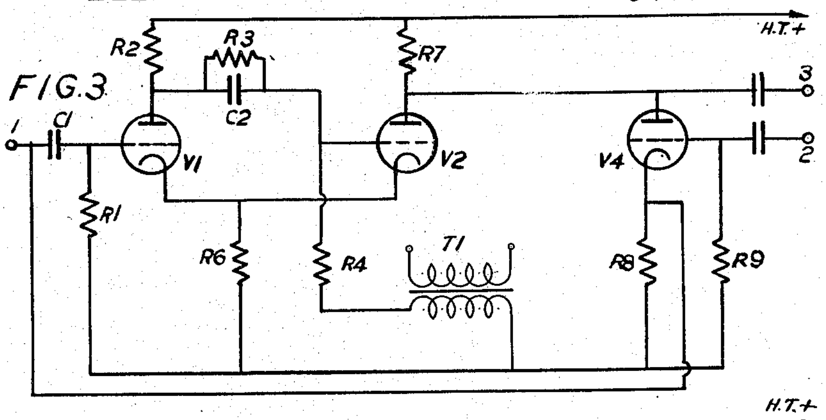
Fig. 3 shows a circuit arrangement for producing the wave form shown in Fig. 2.

Fig. 3 shows a circuit arrangement for obtaining a wave form as shown in Fig. 2. The synchronising pulses are applied at point 1. Due to the short time constant of $C_1R_1$ differentiation occurs and two pulses appear at the grid of $V_1$, the first corresponding to the leading edge of the synchronising pulse which is negative and the second due to the trailing edge which is positive. $V_1$, $V_2$ is a form of cathode-coupled multivibrator circuit, commonly known as a "flip-flop" circuit, the coupling circuit being via $R_2$, $R_3$, $C_2$ and $R_4$ and also the common cathode resistance $R_6$. $V_1$ is normally biassed to cut-off by the voltage set up across $R_6$, and $V_2$ is normally conducting by virtue of the positive grid voltage set up by the potentiometer strip comprising $R_2$, $R_3$ and $R_4$. Due to the inherent negative feed-back voltage set up across the common cathode load $R_6$, the multivibrator is not in a condition to oscillate except under the influence of a positive triggering pulse on the grid of $V_1$. This is supplied by the trailing edge of the synchronising pulse inserted into the differentiating network $C_1$, $R_1$. A positive going pulse is obtained across the anode load $R_7$ of $V_2$. The duration of this pulse is dependent upon the time constant of the multivibrator coupling network and also upon the parts of the characteristic curves of $V_1$, $V_2$ over which they operate. Hence by varying the bias on either $V_1$ or $V_2$, pulses of variable width are produced at the anode of $V_2$. The leading edge, however, of these pulses always occurs at the same instant as the trailing edge of the synchronising pulse.

In practice the sound modulation is applied via transformer $T_1$ and directly varies the bias on valve $V_2$. The pulses produced vary in width about a mean value which they assume when no modulation is applied.

Having now obtained the "whiter-than-white" sound modulated pulses, it is necessary to add to these both the synchronizing pulses and the video signal, the interline spurious signal of which has already been removed by blanking the black level at some previous point (not shown) in the amplifier chain. This is achieved by means of valve $V_4$. Negative synchronizing pulses derived from the same low impedance source which supplies point 1 are applied to the cathode of $V_4$ across the cathode load resistance $R_8$. Video signals, fed to the point 2, are developed across the resistance $R_9$ and applied to the grid of $V_4$. The anode load $R_7$ of this latter valve is common with that of $V_2$. Hence the complete waveform is developed across it and appears at point 3.

At the receiver demodulation is effected, firstly by separating the vision from the synchronising and sound pulses. This may be achieved by using a multivibrator gate circuit similar to that shown in Fig. 3. This could be locked to the leading edge of the synchronizing pulses and the gate valve made so that it could only conduit during the absence of vision signals. The negative going synchronizing pulse may be removed by suitably biassing the gate valve so that only the "whiter-than-white" positive going sound modulation pulses can reach an integrating network at which demodulation occurs.

Figure 4:
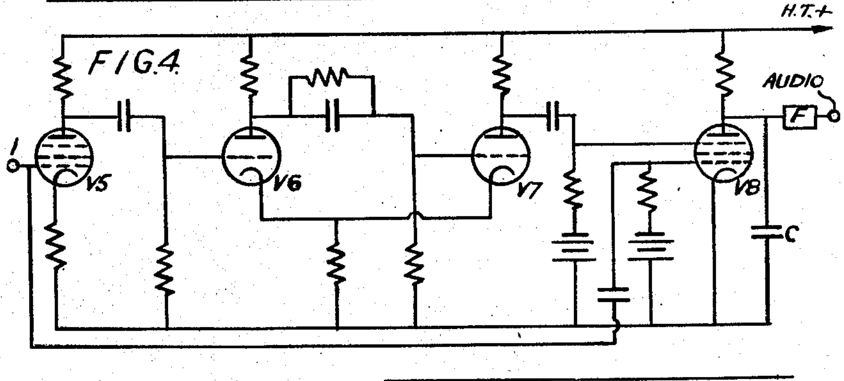
Fig. 4 shows a suitable de-modulating circuit.

Fig. 4 shows a suitable demodulating circuit. Valve $V_5$ inverts the signal so that the synchronising pulses go positively and the sound pulses negatively. $V_6$ and $V_7$ form the multivibrator and $V_8$ the gate valve. At the anode of $V_7$ positive pulses are developed having the leading edge coinciding with the leading edge of the synchronising pulse and the lagging edge occurring just before the video signal starts. Hence $V_8$ is triggered so that it can only conduct during the non-existence of the vision signal. The control grid of $V_8$ is biased so that during this period it is normally cut off except when the sound pulse occurs. The sound modulation is developed across condenser C and filter F cuts off all frequencies above the highest sound modulation frequency.

It is possible to modulate a series of pulses contained within the vision blanking period by means other than varying their width. For instance, the phase of the pulse may be varied relative to a fixed point, for example, such as the beginning of the video blanking or the start of the synchronising pulse.

Figure 5:
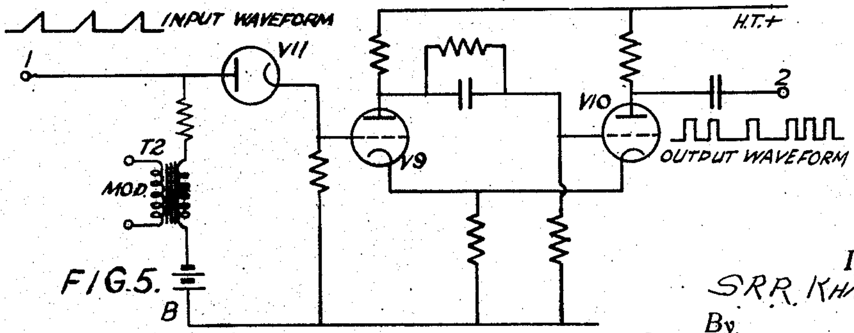
Fig. 5 shows an alternative generator circuit for producing pulses, the phase of which is shifted in accordance with the sound modulation.

Fig. 5 shows a circuit which is a suitable generator for variable phase-shifted pulses. Again $V_9$ and $V_{10}$ form a cathode coupled multivibrator circuit. Saw-tooth waves of suitable recurrence frequency and phase are applied at point 1. $V_{11}$ is a diode, the anode voltage of which can be varied by the modulating signal applied via the transformer $T_2$, the secondary of which is in series with the source of biassing potential B. Hence the voltage to which the saw-tooth must rise before the triggering action of the multivibrator can take place depends on the modulating voltage and hence the pulses at 2 are delayed by amounts proportional to the modulation swing.

Figure 6:
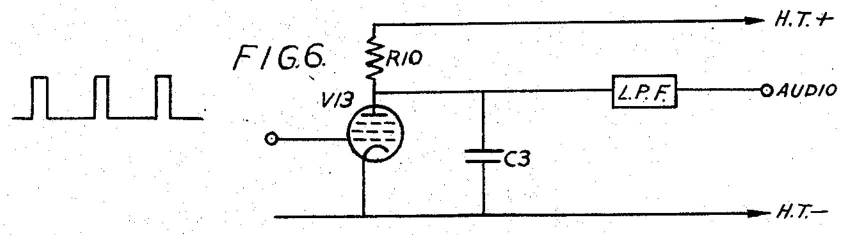
Fig. 6 shows a suitable de-modulating circuit for the phase-shifted pulses produced by the generator shown in Fig. 5.

At the receiver demodulation can be effected by producing a set of saw-tooth waves by integrating the phase-shifted pulses. A suitable circuit is shown in Fig. 6 in which positive phase-shifted pulses are fed to the control grid of a valve $V_{13}$. The integrating condenser $C_3$ is charged up slowly from the high tension supply through the resistance $R_{10}$ and is discharged through the valve $V_{13}$ each time it is made conducting by the application of a positive pulse to the grid of the valve. Since the pulses are applied to the grid at different time intervals, the voltage across the condenser $C_3$ rises to different values, and hence modulation components exist across the condenser. Supersonic frequencies may be filtered out by means of the low-pass filter L. P. F.

Separation of either the variable pulse width modulation or variable phase pulse modulation may, in an alternative arrangement, be effected if the pulses are made of substantially greater amplitude than either the synchronizing pulses or vision signals by over-swinging a valve so that all the signals excepting those containing the sound modulation drive the valve into the cut-off region thereby effecting separation.

In the case of positive video modulation using pulse width modulation as described according to Figs. 2 and 3 of the drawings, all the intelligence other than that contained in the sound modulation pulses may be removed by feeding the signal, if necessary after suitable amplification into a valve so that only the sound pulses T (Fig. 2) do not drive the valve into the cut-off region. In this case only the sound modulated pulses T appear in the anode circuit of the valve and may be demodulated by means of an integrating network.

Figure 7:
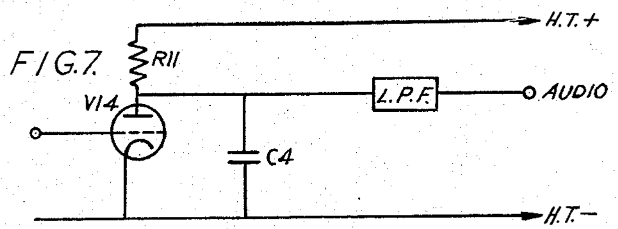
Fig. 7 shows a simplified circuit for separating and de-modulating the sound pulses.

Fig. 7 shows a suitable circuit for this purpose. The condenser $C_4$ is normally charged to the full high tension voltage through the resistance $R_{11}$. However, as soon as a sound modulation pulse T arrives, the valve $V_{14}$ is rendered conducting and the condenser $C_4$ starts to discharge through the valve, the final voltage to which the condenser is discharged depending upon the length of time during which the valve $V_{14}$ is conducting and thus upon the width of the pulse T. Hence modulation components exist across the condenser $C_4$. Supersonic frequencies are filtered out by the low pass filter L. P. F.

The simple separating and demodulating circuit described can, of course, only be used when pulse T extends considerably above the peak white level of the video intelligence so that the separation can be satisfactorily effected.

In an alternative embodiment of the invention, the synchronising pulses themselves may be used for carrying the sound modulation, the leading edges of the synchronising pulse recurring at regular intervals of time but their width being varied as previously described in accordance with the sound modulation. In this case, the minimum duration of the pulses must be sufficiently great to allow effective synchronisation. If negative video modulation is employed, the tips of the synchronising pulses correspond to peak output of the transmitter, and consequently a peak rectifier may again be used at the receiver to produce an automatic gain control voltage. If, on the other hand, the video modulation is of positive character, the tips of the synchronising pulses correspond to minimum transmitter output, and the above mentioned method of producing the automatic gain control voltage in the receiver cannot be used.

Figure 8:
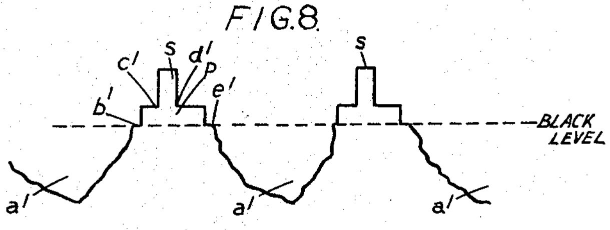
Fig. 8 shows a television wave form of the negative modulation type.

Since, when the synchronising pulses are used to carry the sound modulation, no extra sound modulation pulses are required, this leads to some simplification of the circuits. An application of this embodiment of the invention will now be described with reference to a television waveform employing negative video modulation. Such a television waveform is shown in Fig. 8 in which *a'* represents the picture intelligence, *b'* and *e'* the start and finish of the blanking period, P the pedestal, and *c'* and *d'* the start and end of the synchronising pulse S.

The synchronising pulses S extend in the positive direction and it is therefore convenient to use the peak pulse level for automatic gain control in the receiver, and to width modulate these pulses with sound intelligence so that no additional pulses for carrying the sound intelligence are required.

Figure 9:
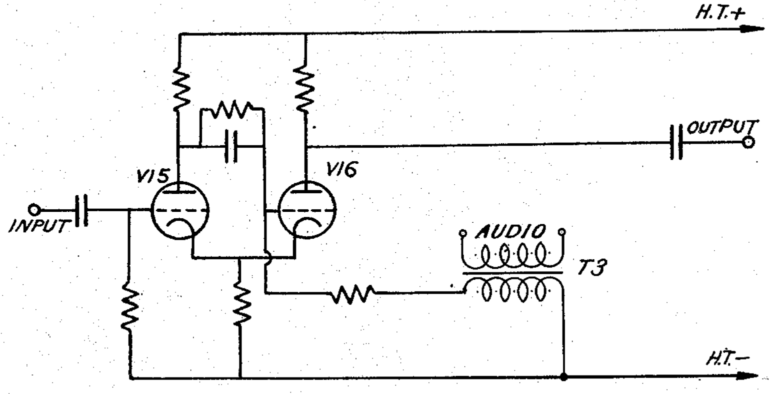
Fig. 9 shows a circuit for modulating the synchronising pulses.

A suitable modulating circuit arrangement for converting the normal line synchronising pulses into sound modulated synchronising pulses is shown in Fig. 9. The lead carrying the line synchronising pulses to the stage which inserts them into the vision signal is broken and the modulating circuit shown is inserted. The sign of the pulses fed to the circuit should be positive. The multivibrator type of circuit comprising the valves $V_{15}$, $V_{16}$ serves to lengthen the line pulses by an amount determined by the bias on the valve $V_{16}$ derived from the sound modulation via the transformer $T_3$. When a positive pulse is applied to the grid of valve $V_{15}$ its anode potential falls and applies a negative potential to the normally conducting valve $V_{16}$, thus producing a positive pulse in the anode circuit of $V_{16}$. Variation in the modulation varies the negative potential at the grid of the valve $V_{16}$ and thus varies the duration of the pulses in the anode circuit of $V_{16}$ about a mean value which they assume when no modulation is applied.

The synchronising system used in the receiver is preferably of the kind which is triggered by the leading edges of the synchronising pulses and is not affected by their duration. Then in the receiver the synchronising pulses, in addition to being applied to the line time base, are also fed to a demodulator which demodulates the modulated synchronising pulses as described above.

Advantages obtained by means of the invention include the use of only one transmitter instead of two, the elimination of separate R. F. and I. F. amplifiers for sound at the receiver, better separation of vision and sound signals, improved signal/noise ratio, and the ease with which the same set of pulses may be used to obtain automatic gain control thereby minimising the effect of fading and saving of frequency space. Moreover, the invention enables the production of a tuneable sound and television receiver, the tuning of which may be effected by a single tuning control, without the necessity of ganging separate sound and vision receivers together. Furthermore, the band width occupied by the system is less than when the sound and vision are transmitted on separate wavelengths.

Although various embodiments of the invention have been described by way of example, it is to be understood that various modifications may be made without departing from the scope of the invention as defined by the appended claims.

I claim:

1. Method of transmitting television signals, including picture intelligence, synchronising signals and the accompanying sound signals in a composite signal by way of a single transmission channel, comprising the steps of transmitting the picture intelligence during the useful line scanning periods, transmitting synchronising signals and auxiliary pulses of constant amplitude in the interval between said periods, modulating said auxiliary pulses in time in accordance with the sound waves to be transmitted to produce sound signals, and retaining a predetermined finite minimum amplitude of said auxiliary pulses, said minimum amplitude being greater than the amplitude of either the picture intelligence or the synchronising signals.

2. Method as claimed in claim 1, wherein the constant amplitude auxiliary pulses are modulated in width.

3. Method as claimed in claim 1, wherein the constant amplitude auxiliary pulses are modulated in phase.

4. A combined sound and television transmitter for transmitting the sound intelligence on the same carrier wave as the picture intelligence and the synchronising signals, comprising means for generating a series of pulses of constant amplitude at the frequency of the picture line scanning frequency, means for modulating said pulses in time in accordance with the sounds to be transmitted, and means for inserting said pulses into the composite waveform to be transmitted during the line blanking periods with an amplitude which is greater than the amplitude of either the picture intelligence or the synchronising signals.

5. Transmitting apparatus for a combined sound and television system in which the video signal is transmitted with positive modulation and, in the line blanking periods, the synchronising pulses are immediately followed by width modulated sound pulses of constant amplitude, comprising means for producing the line synchronising pulses, means for differentiating each syncronising pulse to produce two pulses of which the first corresponds to the leading edge of the synchronising pulse and the second to the trailing edge thereof, a sound pulse generator for generating a series of sound pulses, means for triggering the sound pulse generator by means of said second pulses corresponding to the trailing edges of the synchronising pulses, whereby the leading edges of the sound pulses always occur at the same instant as the trailing edges of the synchronising pulses, means for modulating the width of the sound pulses in accordance with the sound modulation to be transmitted, and means for combining the picture intelligence, the synchronising pulses and the sound pulses into a composite waveform.

6. Apparatus as claimed in claim 5, wherein the synchronising pulses and the video signals are added to the modulated sound pulses by means of a valve connected to the output of the sound pulse generator.

7. Apparatus as claimed in claim 5, wherein the synchronising pulses and the video signals are added to the modulated sound pulses by means of a valve connected to the output of the sound pulse generator, negative synchronising pulses derived from the source which supplies the pulses for triggering the sound pulse generator and the video signals being applied to the electrodes of the valve.

8. A transmitter for a combined sound and television system in which the sound intelligence is transmitted on the same carrier wave as the picture intelligence and the synchronising signals as a series of phase modulated pulses which are introduced into the waveform during the line blanking periods, comprising a generator of constant width pulses, means for triggering the generator at varying time intervals in accordance with the modulation to be transmitted, and means for combining the phase modulated pulses with the picture intelligence and the synchronising pulses so that the sound pulses occur in the waveform during the line blanking periods.

9. Apparatus as claimed in claim 8, wherein the sound pulses generator is triggered by means of a circuit comprising a diode to which is fed a series of saw-tooth waves and the modulating voltage, whereby the diode conducts at varying intervals of time corresponding to the summation of the saw-tooth and modulation voltages, thereby triggering the pulse generator at varying intervals of time in accordance with the modulation.

10. A receiver for a combined sound and television system in which the sound intelligence is transmitted on the same carrier wave as the picture intelligence and the synchronising signals as a series of phase modulated pulses which are introduced into the waveform during the line blanking periods, comprising means for separating the phase shifted sound pulses from the picture intelligence and the synchronising signals, and means for integrating the separated sound pulses for demodulating them.

11. A receiver for a combined sound and television system in which the sound intelligence is transmitted on the same carrier wave as the picture intelligence and the synchronizing signals as a series of phase modulated pulses which are introduced into the waveform during the line blanking periods, comprising means for separating the phase shifted sound pulses from the picture intelligence and the line synchronizing pulses, a thermionic valve having a cathode, control grid, and anode, means for feeding the separated phase shifted sound pulses with positive sign to the control grid, an integrating condenser shunted across the anode and cathode of the valve, a resistance connecting the anode of the valve to a source of high tension supply, the condenser being charged up slowly from the high tension supply through the resistance and being discharged through the valve each time it is made conducting by the application of a positive sound pulse to the grid thereof, whereby modulation components are produced across the condenser, and means for feeding the modulation components to an audio frequency amplifier.

12. A receiver for a combined sound and television system in which the sound intelligence is transmitted on the same carrier wave as the picture intelligence and the synchronizing signals as a series of width modulated pulses having a constant amplitude which is substantially greater than the amplitude of either the synchronizing pulses or the picture intelligence, comprising a valve, a source of high tension voltage for the valve, means for biasing the valve so that it conducts only when the sound pulses of greater amplitude are applied thereto, a condenser shunting said valve and normally charged to the full high tension voltage through a resistance, whereby when the valve conducts upon the application of the sound modulated pulses thereto the condenser discharges by varying degrees depending upon the time intervals during which the valve is conducting and thus upon the width of the sound pulses, thereby to produce modulation components across the condenser, and means for feeding the modulated components produced across the condenser to an audio frequency amplifier.

13. A transmitter for a combined sound and television system, comprising means for generating line synchronizing pulses, means for feeding the synchronizing pulses with positive sign to one of a pair of valves connected as a multi-vibrator circuit, means for varying the bias applied to one of the valves of the multi-vibrator circuit in accordance with the sound modulation to be transmitted, thereby to vary the width of the pulses generated in accordance with the sound modulation, means for producing a video signal, and means for combining the modulated synchronizing pulses with the picture intelligence to produce a composite waveform, and means for transmitting the composite waveform.

14. A receiver for a combined sound and television system in which the synchronizing pulses are modulated in width in accordance with the sound to be transmitted, comprising means for separating the synchronizing pulses from the picture intelligence, a time base controlling the scanning of a picture reproducing device, means for triggering the time base by the leading edges of the separated synchronizing pulses, means for demodulating the separated synchronizing pulses, means for feeding the demodulated pulses to a sound reproducing device, and means for feeding the picture intelligence to the picture reproducing device.

15. A receiver for a combined sound and television system in which the sound intelligence is transmitted on the same carrier wave as the picture intelligence and the synchronizing signals as a series of width modulated pulses of constant amplitude which occur during the line blanking periods, comprising means for feeding the received sound pulses with greater amplitude than the picture intelligence and the synchronizing signals to a valve which is biased so that only the greater amplitude sound pulses cause it to conduct, the said valve being shunted by a condenser which is normally charged with the full high tension voltage through a resistance, whereby the condenser discharges on the application of sound modulation pulses to the valve by varying degrees depending upon the times during which the valve is conducting and thus upon the width of the sound pulses to produce modulation components across the condenser, and means for feeding the modulation components to an audio frequency amplifier.

16. A combined sound and television system in which the sound intelligence is transmitted on the same carrier wave as the picture intelligence and the synchronising signals as a series of modulated pulses during the line blanking periods when the picture intelligence is suppressed, comprising means for generating a series of pulses of constant amplitude, means for modulating the pulses in time in accordance with the sounds to be transmitted, means for introducing the modulated constant amplitude sound pulses into the composite waveform to be transmitted with an amplitude which is substantially greater than the amplitude of either the synchronising pulses or the vision signals, a receiver for receiving said composite transmitted waveform, said receiver comprising an amplitude selective arrangement for separating the sound pulses from the picture intelligence and the synchronising pulses such that only the sound pulses of greater amplitude appear in the output circuit of the amplitude selective arrangement, and demodulating means fed from the output of said amplitude selective arrangement.

17. A combined sound and television transmitter comprising means for transmitting the picture intelligence during the useful line scanning periods, means for transmitting the synchronising pulses during the line blanking periods, and means for modulating the synchronising pulses in width by the sound intelligence to be transmitted, the leading edges of the synchronising pulses recurring at regular intervals of time so as to ensure accurate synchronisation and the minimum duration of the synchronising pulses being sufficiently great to allow effective synchronisation.

18. A transmitter for a combined sound and television system comprising means for generating synchronising pulses, means for modulating the width of the synchronising pulses in accordance with the sound modulation to be transmitted, and means for combining the modulated synchronising pulses with the picture intelligence to produce a composite waveform, and means for transmitting the composite waveform.

19. Transmitting apparatus for a combined sound and television system in which the sound intelligence is transmitted on the same carrier wave as the picture intelligence and the synchronising signals as a series of time-modulated pulses of constant amplitude which are introduced into the waveform during the line blanking periods, comprising means for producing the line synchronising pulses, means for deriving from said line synchronising pulses a series of constant amplitude pulses having a mean repetition frequency equal to the line repetition frequency, means for time-modulating said constant amplitude pulses in accordance with the sound intelligence to be transmitted, and means for mixing said time-modulated constant amplitude pulses in opposite phase with said synchronising pulses and with the picture intelligence so that the time modulated constant amplitude pulses and synchronising pulses occur in the line blanking period with opposite sign to each other.

20. Transmitting apparatus for a combined sound and television system in which the sound intelligence is transmitted on the same carrier wave as the picture intelligence and the synchronising signals as a series of time-modulated pulses of constant amplitude which are introduced into the waveform during the line blanking periods, comprising means for producing the line synchronising pulses, means for reversing the phase of said line synchronising pulses, means for deriving from said phase reversed pulses a series of constant amplitude pulses having a mean repetition frequency equal to the line repetition frequency, means for time-modulating said constant amplitude pulses in accordance with the sound intelligence to be transmitted, and means for mixing said time-modulated constant amplitude pulses, with synchronising pulses fed directly from the means for producing said synchronising pulses and without phase reversal and with the picture intelligence so that the time modulated constant amplitude pulses and synchronising pulses occur in the line blanking period with opposite sign to each other.

21. Transmitting apparatus for a combined sound and television system in which the sound intelligence is transmitted on the same carrier wave as the picture intelligence and the synchronising signals as a series of time-modulated pulses of constant amplitude which are introduced into the waveform during the line blanking periods, comprising means for producing the line synchronising pulses, means for generating a series of sound pulses having a mean repetition frequency equal to the line repetition frequency, means for triggering said sound pulse generating means from said synchronising pulses, means for time-modulating said sound pulses in accordance with the sound intelligence to be transmitted, a mixing circuit, means for feeding said time-modulated sound pulses with constant amplitude to said mixing circuit, means for feeding said line synchronising pulses to said mixing circuit with opposite sign to said sound pulses, so that the duration of each pair of sound and synchronising pulses does not exceed the duration of the line blanking period, and means for mixing the sound and synchronising pulses with the picture intelligence so that the sound and synchronising pulses occur within the line blanking period.

22. A method of producing television signals including picture signals and sound signals comprising producing lines of picture signals with intervals between the successive lines, time displacing pulses according to instantaneous values of said sound signals, and interleaving pulses produced by the time displacing operation between said lines of picture signals.

23. A method of producing television signals including picture signals, synchronizing signals and sound signals, comprising producing lines of picture signals with intervals between the successive lines, producing synchronizing pulses occurring during said intervals, time modulating pulses relative to said synchronizing pulses according to instantaneous values of said sound signals, and causing pulses produced by the time modulating operation to occur during said intervals.

24. In television transmission wherein picture signals are separated by horizontal blanking intervals containing horizontal synchronizing signals; a method of producing sound signals for transmission with said picture signals comprising producing pulses time modulated relative to said horizontal synchronizing signals according to instantaneous values of a sound signal wave, and causing pulses produced by the time modulating operation to occure during said blanking intervals.

25. A signalling system comprising a source of intelligence signal trains variable in amplitude only to a maximum value, a second source of intelligence signals of a different kind, means to produce impulse signals of an amplitude approximately equal to the maximum amplitude value of said signal trains but of varying duration in accordance with variations in signals from said second source, a carrier wave source and means to modulate the carrier wave by said intelligence signal trains and said impulse signals.

26. A signalling system comprising means for producing video signals, means for producing signals representing audible effects, means for producing a series of impulses during blanking intervals, each having a steep front side and a linearly sloping end and of substantially constant amplitude, means for varying the amplitude of said successive impulses in accordance with said audio signal while at the same time maintaining the degree of slope at the sloping end, means for deriving constant amplitude variable width impulses from said varying amplitude pulses, and means to transmit said last named impulses along with said video signal.

27. The method of receiving and translating video and sound signals transmitted by a single carrier where the sound signals are impulses of varying duration comprising the steps of receiving the video signals and sound signal impulses, generating local pulses in timed relationship with said video signals and during blanking intervals, and shifting one side of said local pulse in accordance with the time duration of the received impulse.

28. A signalling system comprising means for producing video signals, means for producing signals representing audible effects, means for producing a series of sawtooth impulses of substantially constant amplitude during blanking intervals of said video signals, means for varying the amplitude of said successive impulses in accordance with said audio signals while at the same time maintaining the form of the sawteeth, means for deriving constant amplitude variable width impulses from said varying amplitude pulses, and means to transmit said last named impulses along with said video signals.

SANT R. R. KHARBANDA.

REFERENCES CITED

The following references are of record in the file of this patent:

UNITED STATES PATENTS

| Number | Name | Date |
|---|---|---|
| 2,061,734 | Kell | Nov. 24, 1936 |
| 2,086,918 | Luck | July 13, 1937 |
| 2,089,639 | Bedford | Aug. 10, 1937 |
| 2,152,464 | Browne | Mar. 28, 1939 |
| 2,227,108 | Roosenstein | Dec. 31, 1940 |
| 2,227,596 | Luck | Jan. 7, 1941 |
| 2,266,194 | Guanella | Dec. 16, 1941 |
| 2,266,401 | Reeves | Dec. 16, 1941 |
| 2,268,001 | VonFelgel-Granholz | Dec. 30, 1941 |
| 2,307,249 | Willans | Jan. 5, 1943 |
| 2,326,515 | Bartelink | Aug. 10, 1943 |
| 2,350,902 | Kollman | June 6, 1944 |
| 2,391,776 | Fredendall | Dec. 25, 1945 |
| 2,418,268 | Lawson | Apr. 1, 1947 |

OTHER REFERENCES

Television, Zworykin, 1940, pages 549, 550.

Proceedings I. R. E., Feb. 1946, pages 40 to 61.

Electrical Communication, vol. 22, No. 2–1944, pages 91 to 98.